(12) United States Patent
Tamamura

(10) Patent No.: US 6,536,122 B2
(45) Date of Patent: Mar. 25, 2003

(54) LASER LINE BEAM EMITTING APPARATUS HAVING FUNCTIONS OF LASER MARKING OR PLUMB INSTRUMENT, OR LEVELER

(75) Inventor: Akihito Tamamura, Sabae (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 0 days.

(21) Appl. No.: 10/056,566

(22) Filed: Jan. 25, 2002

(65) Prior Publication Data

US 2002/0184773 A1 Dec. 12, 2002

(30) Foreign Application Priority Data

Jun. 13, 2001 (JP) ......................................... 2001-178288

(51) Int. Cl.[7] .............................................. G01C 15/10
(52) U.S. Cl. .............................. 33/283; 33/286; 33/291; 33/397; 33/DIG. 21
(58) Field of Search ................................. ; G01C 15/10

(56) References Cited

U.S. PATENT DOCUMENTS

| | | | | |
|---|---|---|---|---|
| 4,106,207 A | * | 8/1978 | Boyett et al. | 33/286 |
| 5,459,932 A | * | 10/1995 | Rando et al. | 33/291 |
| 5,782,003 A | * | 7/1998 | Bozzo | 33/291 |
| 6,009,630 A | | 1/2000 | Rando | 33/291 |
| 6,043,879 A | * | 3/2000 | Dong | 33/291 |
| 6,256,895 B1 | | 7/2001 | Akers | 33/286 |

* cited by examiner

Primary Examiner—Christopher W. Fulton
(74) Attorney, Agent, or Firm—Welsh & Katz, Ltd.

(57) ABSTRACT

There is provided a laser line beam emitting apparatus with high durability. The apparatus according to the present invention has avoidance of deformed or damaged shafts by construction where possible free maintenance of the balance of the pendulum being locked against the swings prevents production of applied unnatural force to the shaft. It includes a pendulum 60 having a laser beam source unit assembled thereinto, gimbals mechanism having the pendulum 60 hung therefrom, a stopper 70 having a function of stop of swings of the pendulum 60, and a pressure member 75 to press the pendulum against the stopper for stop of swings of the pendulum 60. The gimbals mechanism comprises a plurality of links 53, 55, 57, which are linked in series through combination of a plurality of horizontal shafts 52, 54 disposed in a parallel arrangement with each other and a plurality of horizontal shaft 56, 58, which is at the right angle to the horizontal shafts 52, 54. When the pressure member 75 presses on the pendulum 60, each of the plurality of links 53, 55, 57 has preferred swings with the maintained balance of the pendulum.

13 Claims, 2 Drawing Sheets

LASER LINE BEAM EMITTING APPARATUS HAVING FUNCTIONS OF LASER MARKING OR PLUMB INSTRUMENT, OR LEVELER

FIELD OF THE INVENTION

The present invention relates to a laser line beam emitting apparatus which is employed as a laser marking apparatus with the emission of laser beam(s) or ray(s) (hereinafter, laser beam) to an objective, and particularly to a laser line beam emitting apparatus, which is directed to the construction industry for measurement of objectives such as walls, ceilings, floor, and etc. of a building under construction, with the emitted beams.

BACKGROUND OF THE INVENTION

Nowadays, the construction industry uses the laser line beam emitting apparatus in place of the marking (or ink pad) technique, that carpenters or construction workers measure the objectives by drawing a vertical or horizontal line on respective surfaces with a Chinese ink or chalk.

The apparatus produces a laser line beam (a drawn line) by collimating diffusive semiconductor laser beam through a collimator lens therein, and then generating unidirectional diffusion of the collimated laser beam through a cylinder-shaped rod lens therein. In addition, it performs the horizontal or vertical preservation (a horizontal or plumb line) of the laser line beam by the gimbals mechanism. The gimbals mechanism allows for constantly positioning of a laser beam source unit having united hold of the semiconductor laser, and collimator and rod lenses through its holder. In the gimbals mechanism, its pendulum maintains the constant position of the laser beam source unit disposed therein such that even though the laser line beam emitting apparatus inclines downward or upward, it provides the horizontal or plumb laser line beam.

For the gimbals mechanism according to the conventional laser line beam emitting apparatus that it holds shaft(s) by ball bearing(s) which comprise precise parts, crosswise impact force load with respect to the bearing axle produces force in the direction in which the shaft bends, and then such the precise ball bearing become deformed and is damaged.

In addition, the laser line beam emitting apparatus has a mechanical lock to prevent excessively swinging or moving of the laser beam source unit which is assembled into a pendulum, at the carriage, and the mechanical lock locks the laser source unit except of time of the use. The problem is that depending on the structure of mechanical lock, the shaft and the ball bearing to hold the shaft experiences load, and the ball bearing becomes deformed and is damaged by the impact force further applied thereto.

Such the deformation of or damage to the ball bearing make impossible balance of the pendulum, as well as correct emission of the horizontal or vertical beam.

For the above reason, the present applicant has invented and applied for patent on a gimbals mechanism of a laser line beam emitting apparatus, characterized by having a shaft with two steps between up and down. Japanese patent application No. 2000-230326 discloses the invention. The foregoing gimbals mechanism has possible prevention of deformation of or damage to the ball bearing with hold of the shaft, by means of dispersion of the impact force load to the shaft into the shafts comprised of two stages in up and down arrangement.

When the carpenter or construction worker ascertains verticality of objectives such as columns or walls, or level of objectives such as beams, window frames and so on, he employs a plumb instrument or leveler. If a laser line beam emitting apparatus as a laser marking apparatus may perform functions of the plumb instrument or leveler, there is no need of the plummet instrument or the leveler. This will convenience for the users, and reduce bore cost.

SUMMARY OF THE INVENTION

In view of the subject matter as previously described, it is the first object of the present invention to provide a laser line beam emitting apparatus having more effective improvement in construction of the gimbals mechanism than the foregoing prior arts. Even though the pendulum is locked by a lock mechanism against the swing, it can take a free position to avoid that it holds with strong force against the shaft in the gimbals mechanism. Hence, the present invention provides a laser line beam emitting apparatus having high durability, which allows for prevention of deformation of and damage to the shaft.

In combination with the foregoing improvement, it is the second object of the present invention to provide a gimbal mechanism undergoing improvement in construction, enabling the use of the laser line beam emitting apparatus as either or both of a plummet instrument and a leveler.

In the laser line beam emitting apparatus according to the present invention, the laser line beam source unit is assembled into the pendulum, which is hung from the gimbals mechanism. The gimbals mechanism comprises a plurality of first horizontal shafts provided in a parallel arrangement; a plurality of second horizontal shafts provided in a parallel arrangement, being at right angles to the first horizontal shafts; and a plurality of links linked in series through respective first and second horizontal shafts. The laser line beam emitting apparatus has a stopper disposed opposite the pendulum therein, and a pressure member disposed on the opposite side from the stopper with respect to the pendulum, having contribution to pressing of the pendulum into the stopper for a stop of swings of the pendulum. Each of the links swings about respective first and second horizontal shafts for positioning of the pendulum into the stopper with maintenance of the balance.

The gimbals mechanism according to the present invention has a constructional feature for provision of the balanced pendulum. It comprises four horizontal shafts, and three links. The first link, which is hung from and has free swings about the first horizontal shaft extending from a lateral inner housing portion of the laser line beam emitting apparatus and passing a portion on the side of its trailing end, has a freely swinging hold on the second link on the side of its leading end through the second horizontal shaft provided in a parallel arrangement with the first horizontal shaft and passing a portion on the side of its leading end. The second link has a swinging hold on the third link on the side of its leading end through the third horizontal shaft which is at right angles to the first and second horizontal shafts on the side of its trailing end and passing a portion on the side of its leading end. The third link has a swinging hold on the pendulum through the fourth horizontal shaft on the side of its leading end. Such the constructive gimbals mechanism contributes to free swings of the pendulum with maintenance of balance. The parallel and perpendicular shafts may be provided in an alternate arrangement.

In the laser line beam emitting apparatus according to the present invention, the stopper has a V-shape sectioned groove into which one side face of the pendulum comes. Accordingly, when the pendulum is held in the groove, it can not swing.

Reception of the pendulum by the V-shape sectioned groove surface of the stopper is performed in accordance with virtual reference surfaces, which may establish a predetermined relative position relationship between the former and latter or suitable position of the received pendulum with maintenance of balance.

When the stopper stops the pendulum from swinging, the laser line beam emitting apparatus having a construction combining the precise formation of the V-shape sectioned groove surface, one side face of the pendulum with an establishment of a precise contact of the outer housing surface thereof with an objective to be examined as well as the precisely formed housing with right-angled emission of the laser beam with respect to a reference surface such as a floor allows the user to know or ascertain a verticality or horizontality of the objective with the emitted laser beam from the laser beam source unit.

The V-shape sectioned groove of the stopper establishes a reference surface on which the lateral surface of the pendulum engages such that the emitted laser beam from the laser beam source unit may provides information of the verticality or horizontarity.

PREFERRED EMBODIMENT OF THE INVENTION

Following descriptions are directed to embodiments of a laser line beam emitting apparatus according to the instant invention, with reference to their drawings.

Figure 1:
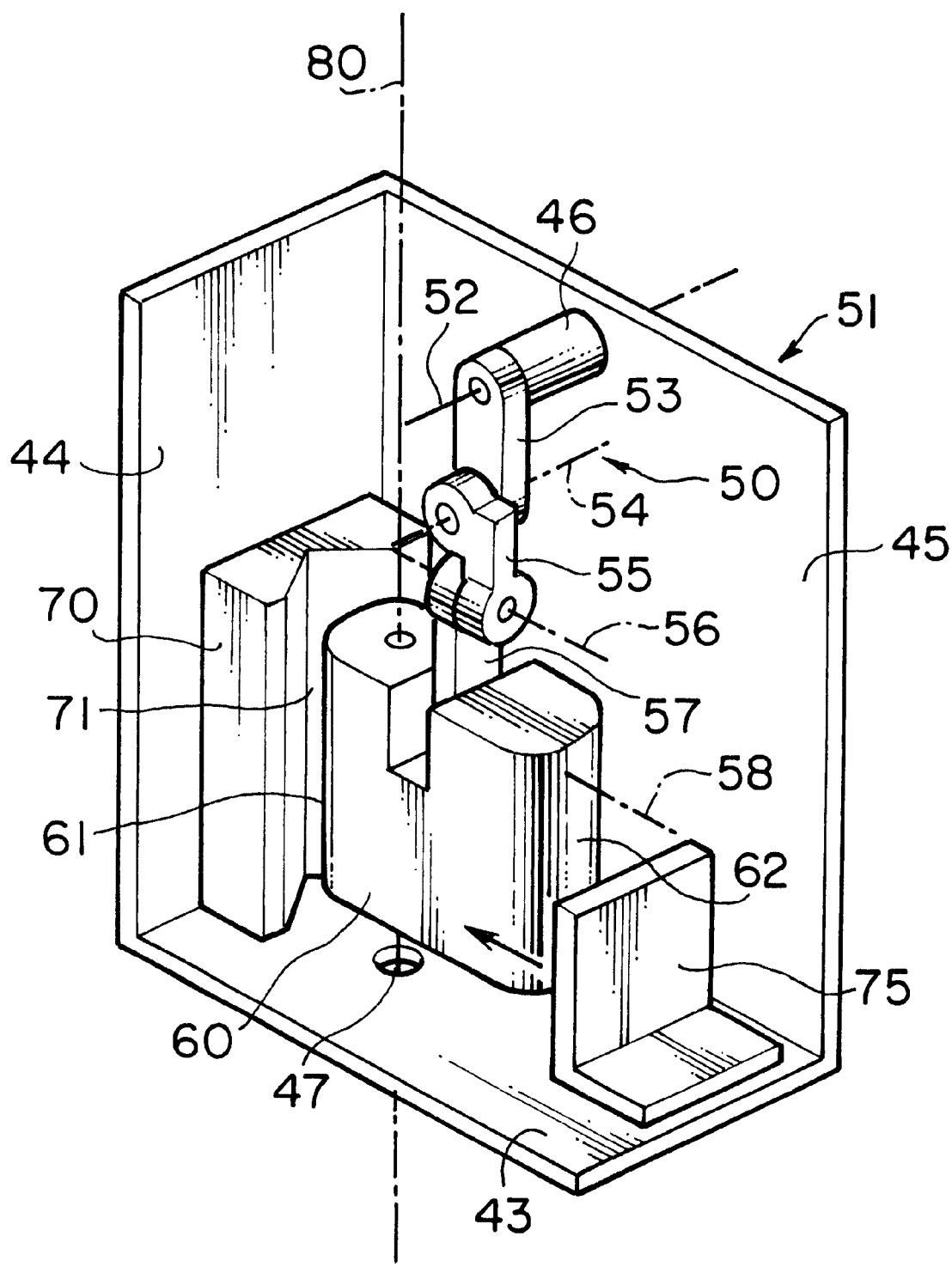
FIG. 1 is a perspective view of a laser line beam emitting apparatus, showing an embodiment of the present invention.

FIG. 1 shows a laser line beam emitting apparatus according to the instant invention, wherein a gimbals mechanism 50, which is mounted on an inner housing 51, suspends a pendulum 60 therefrom. The pendulum has a laser beam source unit assembled thereinto. Following passages give more detail description about respective elements or components of the laser source unit.

Referring to FIG. 1, the housing 51 is of a rectangular parallelepiped, which comprises bottom, a pair of side, and back plates 43, 44, 44, and 45 and that respective plates have right-angle connections to each other, respectively. The drawing omits one of side plates, and a ceiling plate (actual existence) from the housing 51 as shown therein. In the laser line beam emitting apparatus, the gimbals mechanism comprises a first horizontal shaft 52 horizontally disposed, extending from the back plate 45 of the housing 51, a first link 53 hung from and having possible swings about the first horizontal shaft 52, a second link 5 hung from the first link through and having possible swing about a second horizontal shaft 52 parallel to the first horizontal shaft 52, a third link 57 hung from the second link 5 through and having possible swing about a third horizontal shaft 56 that it is at right angles to the first and second horizontal shafts 52, 54, and a fourth horizontal shaft 58 disposed parallel to the third horizontal shaft 56 for hanging a pendulum 6 linked to the fourth link 57.

To produce a predetermined space between the housing 51 and the first link 53, there is a tubular spacer about the first horizontal axis 52. Hanging the pendulum 60 up the fourth horizontal axis according to the foregoing gimbals mechanism always may produce a precise vertical or horizontal laser beam, because of that the pendulum 60 maintains its horizontal balance with respect to the horizontal line, even though the housing 51 of the laser line beam emitting apparatus is tilted. The pendulum 60 into which a laser beam source unit is assembled may provide function of plumb (laser marking instrument).

According to FIG. 1, the vertical laser beam 80 is emitted. The bottom plate 43 of the housing 51 has a circular hole 47 for emitting the laser beam 80 in the downward direction with respect to the laser beam source unit. The pendulum may have either or both of a laser beam source unit for vertical laser line emission and a laser beam source unit for horizontal laser line emission, which are assembled thereinto. Therefore, the laser line beam emitting apparatus according to the present invention enables emission of either or both of vertical and horizontal laser line beams. With the construction, the housing 51 may be formed with a hole (not shown) for emission of a horizontal laser line beam Each of the laser beam source units for laser line beam emission comprises a laser beam source such as a semiconductor laser, a collimator lens for collimation of a diffused, emitted laser beam from the laser beam source, a rod lens for diffusion of the collimated laser beam only in one direction, a holder for hold of the optical elements, and so on. The laser beam source unit for vertical laser beam is arranged such that the rod lens functions to impart diffusion only in the vertical direction (formation of a straight line perpendicular to the horizontal line) to the collimated beam, while the laser beam source unit for horizontal laser beam is arranged such that the rod lens functions to impart diffusion only in the horizontal direction (formation of a straight line parallel with the horizontal line) to the collimated beam.

As shown in FIG. 1, a stopper 70 is fixed to the side plate 44 of the housing 51. The stopper 70 comprises an elongated member with position opposite a first side face of the pendulum 60, and is formed with a sectional V-shape groove 71. The sectional V-shape groove 71 is arranged opposite a semicircular face 61 formed on the first side face of the pendulum 60. The groove 71 has a sufficient size to meet position of the semicircular face 61 thereinto. On the side opposite from the stopper 70 with respect to the pendulum 60, a pressure member 75 is disposed on the bottom plate 43 of the housing 51. The pressure member 75 is of L-shape, which comprises a vertical plate opposite a second side face 62 of the pendulum 60, and a horizontal plate extending from the leading end of the vertical plate and having slide along the bottom plate 43 by the external operation. The slid pressure member 75 presses against the second side face 62 of the pendulum 60 so that the first side face 61 is pressed into the sectional V-shape groove 71 to provide locked movement of the pendulum 60.

As described above, the pendulum 60 is swingly linked to the third link 57 of the gimbals mechanism through the horizontal shaft 58, and hung from the horizontal shaft 58. The third link 57 is swingly linked to the second link 55 through the horizontal shaft 56 parallel with the horizontal shaft 58, the second link 55 is swingly linked to the first link 53 through the horizontal shaft 54 perpendicular to both of the horizontal shafts 58, 56, and the first link 53 is swingly linked to the spacer 46 through the horizontal shaft 52 parallel with the horizontal shaft 54. With such the construction, the third link 57 permits forward and backward movements of the pendulum 60, while the first and second links 53, 55 permits rightward and leftward movements of the pendulum 60. Hence, the pendulum 60 can maintain its balance (vertical position) regardless of the tilted laser line beam emitting apparatus, with the exception of the movements caused by external force applied thereto.

Thus, with the assemblage of the laser beam source unit into the pendulum 60, since the laser beam 80 is constantly emitted along the vertical line, the laser line beam emitting apparatus may provide the same function as that a vertical straight line is drawn on objects such as walls, ceiling, or floor by a Chinese ink or chalk. In addition, when the pendulum 60 has either or both of a laser line beam source unit for emission of the vertical laser line beam or/and a laser line beam source unit for emission of the horizontal laser line beam, which are assembled thereinto the pendulum 60, the laser line beam emitting apparatus may produce the vertical or/and horizontal laser line beam(s) emitted to such the objectives, respectively.

When the carpenter or construction worker(s) carry or move the laser line beam emitting apparatus, he may lock the swung pendulum 60. The lock of pendulum 60 is performed in such a manner that the carpenter or construction worker operates to cause slide of the pressure member 75 along the bottom plate 43 of the housing 51 for pressure against the second side face 62 of the pendulum 60, whereby the pendulum 60, and the foregoing plural links 53, 55, 57 swing or move about respective shafts 52, 54, 56, 58 to press against the first side face 61 of the pendulum 60 into the sectional V-shape groove 71 of the stopper 70 so that the pendulum 60 is locked.

Figure 2:
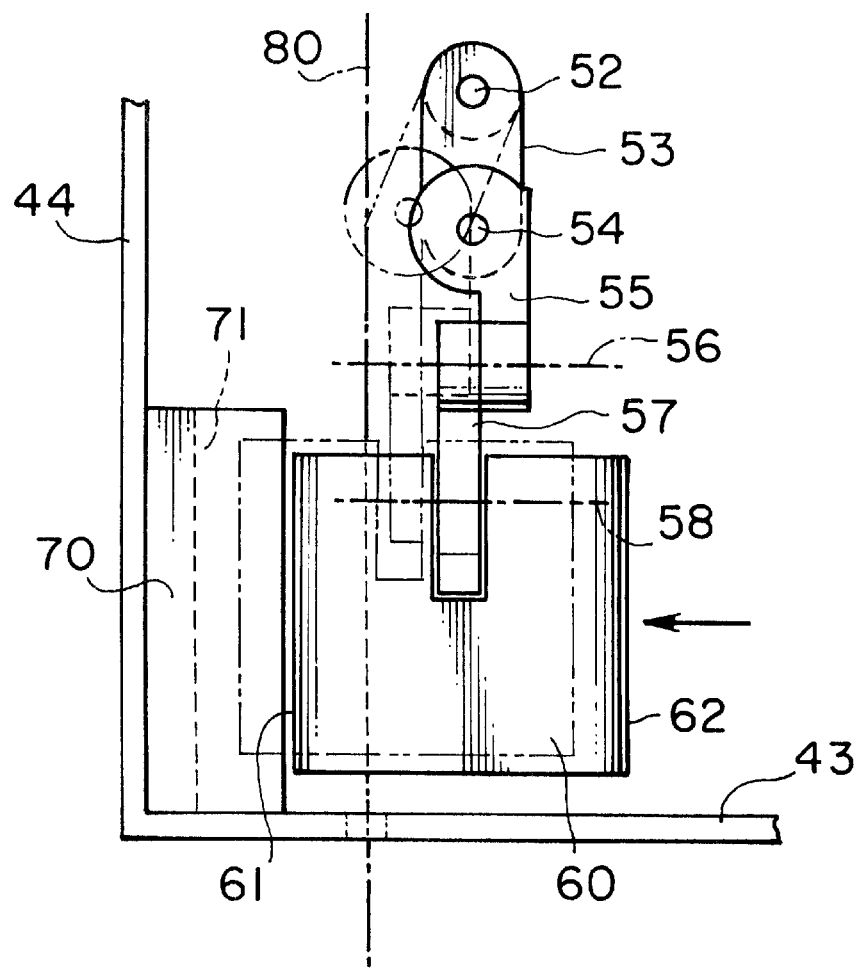
FIG. 2 is a front view of the laser line beam emitting apparatus, showing a lock action of a pendulum to a stopper.
Figure 3:
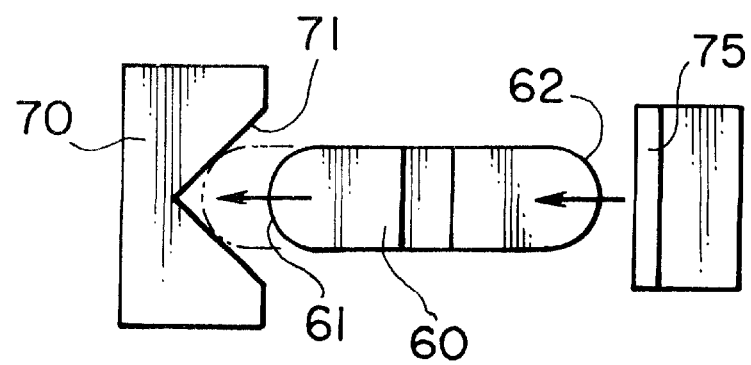
FIG. 3 is a plain view of the laser line beam emitting apparatus, showing the lock action of the pendulum to the stopper.

As shown by virtual lines in FIGS. 2, 3, during the time when the first side face 62 of the pendulum 60 is coming into the groove 71, the pendulum 60, which is hung from the links linked in series thorough respective parallel horizontal shafts 52, 54 and respective parallel horizontal shafts 56, 58 perpendicular to the shafts 52, 54, takes up a position where it fits with the groove 71 by the rotation of the links about respective shafts. Thus, the pendulum 60 is locked by engagement of the first side face 61 with the groove 71.

With the foregoing construction, the gimbals mechanism does not experience great force applied to the horizontal shafts, because of that the swung plural links impart free favorable position to the pendulum 60 which becomes locked. In addition, when each of the horizontal shafts experiences external force exerted thereon perpendicularly thereto, each of the links swings or rotates about one horizontal shaft perpendicular to the other horizontal shaft so that the external force is relieved, and the pendulum 60 gets locked without production of the great force exerted on the horizontal shafts. Any impact force as caused during the time when the pendulum 60 is locked, won't easily reach the horizontal shafts. Hence, the gimbals mechanism can avoid bending of and damage to the horizontal shafts, and provide a laser line beam emitting apparatus with high drurability which does not cause loss of verticality of the pendulum 60 with prolonged usage.

The locked pendulum 60 may provide the laser line beam emitting apparatus having function of a level or plummet instrument. The precise formations of the sectional V-shape groove 71 of the stopper 70, and the first side face 61 of the pendulum 60 for production of reference faces, contribute to correct position of the locked pendulum 60 (emitted laser line beam). The precise formations of the internal surface of the bottom plate 43 of the housing 51, and the exact right angle positions of the side plates 44 with respect to the bottom and back plates 43, 45 with precise formations of the internal surfaces thereof, contribute to the vertically exactly emitted laser beam from the laser beam source unit assembled into the locked pendulum 60.

The carpenter or construction worker may check plumb of the objective relative to a reference vertical line by a combination of the laser line beam emitting apparatus whose external side or back plate 44 or 45 has whole precise contact with the objective surface such as a column or beam, or wall, and the emitted laser beam from the laser beam source unit which is assembled into the locked, pressed pendulum 60 against the V-shape groove 71 of the stopper 70; and comparison of the emitted laser beam line 80 with the reference vertical line. Alternately, the bottom plate 43 with precise whole contact with the objective surface may provide the laser line beam emitting apparatus with the function which provides ascertainment of plumb of the objective relative to a reference horizontal line by comparison of the emitted laser beam 80 with the reference horizontal line. These processes are to employ the laser line beam emitting apparatus for the plumb instrument.

Additionally, the locked, pressed pendulum 60 against the V-shape groove 71 of the stopper 70, and the side or back plate 44 or 45 whose external face has whole precise contact with the objective surface such as a flooring or beam in combination with comparison of the emitted laser beam 80 with a reference horizontal line provides the laser line emitting apparatus with function of which allows for ascertainment of levelness of the objective relative to the reference horizontal line. Alternately, the bottom plate 43 whose external face has whole contact with the objective surface in combination with comparison of the emitted laser beam 80 with a reference vertical line provides the laser line emitting apparatus with function of which allows for ascertainment of levelness of the objective relative to the reference vertical line. These processes are to employ the laser line beam emitting apparatus for the leveler.

As described above, the laser line beam emitting apparatus according to the present invention performs a function of a laser marking instrument, which allows for high precise marking for rather long period because of that the locked pendulum prevents the force and shock unnaturally acting on the shaft of the gimbals during the movement or carriage thereof being. In addition, the laser line beam emitting apparatus may have functions of a level or plumb instrument as well as a plumb bob that the pendulum provides.

In the gimbals mechanism in accordance with the illustrated embodiment, the links are linked through a combination of the two first horizontal shafts extending from the side with respect to the gimbals mechanism, and the two second horizontal shafts crossing the first horizontal shaft at a right angle. The condition for each of the first and second horizontal shafts is the plural existence. Accordingly, over two pieces of the first and second horizontal shafts may exist, respectively. However, if the first and second horizontal shafts are two and two, it will be sufficient to produce the effect.

Furthermore, the gimbals mechanism in accordance with the illustrated embodiment has arrangements of, respectively, two consecutive first horizontal shafts and two consecutive second horizontal shafts, which are at the right angle to the first shafts. This has the advantage to prevent the unnatural force acting on each of the horizontal shafts from the locked pendulum. However, the first and second horizontal shafts with the alternate arrangement may give an effect of balancing the pendulum coming to the groove of the stopper.

What is claimed is:

1. A laser line beam emitting apparatus comprising a housing having a first surface formed inside thereof;
   a laser beam source unit to emit a laser line beam therefrom;
   a pendulum into which said laser beam source unit is assembled, having swings, the pendulum having a second surface and a third surface on the side opposite from the second surface;
   a gimbals mechanism from which said pendulum with the assembled laser beam source unit is hung, provided in said housing;
   a stopper having a fourth surface opposite the first surface of said housing, and a fifth surface opposite the second surface of said pendulum, provided in said housing; and
   a pressure member provided in said housing at an opposite position to the third surface of said pendulum, having contribution to push of the third surface of said pendulum for movement and hold of the second surface of said pendulum into the fifth surface of said stopper so as to stop swings of said pendulum.

2. The laser line beam emitting apparatus as defined in claim 1, wherein said gimbals mechanism comprises a plurality of first horizontal shafts provided in a parallel arrangement; a plurality of second horizontal shafts provided in a parallel arrangement, being at right angles to said plural first horizontal shafts; and said plurality of links, respectively, linked in series through any of said first and second horizontal shafts with one of the links having a swinging hold on said pendulum, whereby said pendulum maintains a predetermined balance.

3. The laser line beam emitting apparatus as defined in claim 1, wherein the fifth surface of said stopper is a reference surface, which establishes both of hold of the second surface of said pendulum and maintaining of balance of said pendulum being held by said stopper.

4. The laser line beam emitting apparatus as defined in claim 3, wherein said reference surface is a sectional V-shape groove.

5. The laser line beam emitting apparatus as defined in claim 1, wherein the first surface of said housing and the fourth surface of said stopper are connected to each other, wherein said connected first and fourth surfaces in combination with the second surface of said pendulum being held into the fifth surface of said stopper locates the laser line beam emitted from said laser beam source unit, and wherein said housing has at least one external surface, which has a precise contact in whole with a surface of an objective to examined, whereby the located, emitted laser line beam provides information of verticality or horizontality of the examined objective.

6. The laser line beam emitting apparatus as defined in claim 5, wherein the fifth surface of said stopper is a reference surface, which establishes hold of the second surface of said pendulum, and a predetermined location of the laser line beam emitted from said laser beam source unit.

7. The laser line beam emitting apparatus as defined in claim 6, wherein said reference surface is a V-shape sectioned groove.

8. A laser line beam emitting apparatus comprising
   a housing having a first surface formed inside thereof;
   a laser beam source unit to emit a laser line beam therefrom;
   a pendulum into which said laser beam source unit is assembled, having swings, the pendulum having a second surface and a third surface on the side opposite from the second surface
   a gimbals mechanism from which said pendulum with the assembled laser beam source unit is hung, the gimbals mechanism comprising a first horizontal shaft horizontally extending from an internal surface of said housing, a second horizontal shaft provided in a parallel arrangement with said first horizontal shaft, third and fourth horizontal shafts provided at right angle to said first and second shafts, a first link having free swings about said first horizontal shaft on the side of its trailing end portion, a second link linked with a leading end portion of said first link through said second horizontal shaft on the side of its trailing end, and a third link linked with a leading end portion of said second link through said third horizontal shaft on the side of its trailing end and having free swings about said third horizontal shaft, said pendulum being swingly hung from said fourth horizontal shaft through said third link having said fourth horizontal shaft on the side of its leading end, said pendulum maintaining its balance;
   a stopper having a fourth surface opposite the first surface of said housing, and a fifth surface opposite the second surface of said pendulum, provided in said housing; and
   a pressure member provided in said housing at an opposite position to the third surface of said pendulum, having contribution to push of the third surface of the said pendulum for movement and hold of the second surface of said pendulum into the fifth surface of said stopper so as to stop swings of said pendulum.

9. The laser line beam emitting apparatus as defined in claim 8, wherein the fifth surface of said stopper is a reference surface, which establishes both of hold of the second surface of said pendulum and maintaining of balance of said pendulum being held by said stopper.

10. The laser line beam emitting apparatus as defined in claim 9,
    wherein said reference surface is a sectional V-shape groove.

11. The laser line beam emitting apparatus as defined in claim 8, wherein the first surface of said housing and the fourth surface of said stopper are connected to each other, wherein said connected first and fifth surfaces in combination with the second surface of said pendulum being held into the fifth surface of said stopper locates the laser line beam emitted from said laser beam source unit, and wherein said housing has at least one external surface, which has a precise contact in whole with a surface of an objective to examined, whereby the located, emitted laser line beam provides information of verticality or horizontality of the examined objective.

12. The laser line beam emitting apparatus as defined in claim 11, wherein the fifth surface of said stopper is a reference surface, which establishes hold of the second surface of said pendulum into the fifth surface of said stopper, and a predetermined location of the laser line beam emitted from said laser beam source unit.

13. The laser line beam emitting apparatus as defined in claim 12, wherein said reference surface is a sectional V-shape groove.

* * * * *